(12) United States Patent
Kim et al.

(10) Patent No.: US 11,655,892 B2
(45) Date of Patent: May 23, 2023

(54) TRANSMISSION LEVER DEVICE FOR AUTOMOBILE

(71) Applicants: HYUNDAI MOTOR COMPANY, Seoul (KR); KIA CORPORATION, Seoul (KR)

(72) Inventors: Yong Hee Kim, Suwon-si (KR); Jong Mo Goo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 3 days.

(21) Appl. No.: 17/365,664

(22) Filed: Jul. 1, 2021

(65) Prior Publication Data
US 2022/0107019 A1    Apr. 7, 2022

(30) Foreign Application Priority Data
Oct. 6, 2020    (KR) .......................... 10-2020-0128737

(51) Int. Cl.
*F16H 59/10*    (2006.01)
*F16H 61/22*    (2006.01)
*F16H 59/02*    (2006.01)
*F16H 61/24*    (2006.01)

(52) U.S. Cl.
CPC ......... *F16H 59/10* (2013.01); *F16H 59/0278* (2013.01); *F16H 61/22* (2013.01); *F16H 61/24* (2013.01); *F16H 2059/0282* (2013.01); *F16H 2061/247* (2013.01)

(58) Field of Classification Search
CPC ...... F16H 59/10; F16H 59/0278; F16H 61/22; F16H 61/24; F16H 2059/0282; F16H 2061/247; F16H 61/18
See application file for complete search history.

(56) References Cited

U.S. PATENT DOCUMENTS

| | | | | |
|---|---|---|---|---|
| 2,919,600 | A * | 1/1960 | Lincoln | ........................ 74/484 R |
| 4,086,822 | A * | 5/1978 | Kuroda | ................... F16H 61/26 74/491 |
| 4,355,543 | A * | 10/1982 | Ikemoto | ................ F16H 59/042 403/140 |
| RE31,451 | E * | 11/1983 | Osborn | .................. B60K 20/02 74/900 |
| 5,435,424 | A * | 7/1995 | Murakami | .............. F16H 59/10 74/557 |
| 6,122,986 | A * | 9/2000 | Cook | ...................... F16H 59/02 74/533 |

(Continued)

FOREIGN PATENT DOCUMENTS

| | | | | |
|---|---|---|---|---|
| CN | 105090470 A | * | 11/2015 | ............. B60K 20/04 |
| KR | 10-1534930 B1 | | 7/2015 | |

*Primary Examiner* — William C Joyce
*Assistant Examiner* — Gregory T Prather
(74) *Attorney, Agent, or Firm* — Lempia Summerfield Katz LLC

(57) ABSTRACT

A transmission lever device for an automobile includes: a base; a lever rotatably mounted on the base, wherein the lever is configured to select one of sequentially disposed gear positions including park (P), reverse (R), neutral (N), drive (D), and low (L) by a linear movement and to be movable from P to L and from L to P; and a blocker mounted on the base and configured to restrict and wide movement of the lever from P to L.

20 Claims, 16 Drawing Sheets

(56) References Cited

U.S. PATENT DOCUMENTS

| | | | | |
|---|---|---|---|---|
| 2008/0022802 | A1* | 1/2008 | Sumi | F16H 59/0278 |
| | | | | 74/473.21 |
| 2009/0272216 | A1* | 11/2009 | Wilson | F16H 59/0204 |
| | | | | 74/473.19 |
| 2012/0103122 | A1* | 5/2012 | Morrissett | F16H 59/10 |
| | | | | 29/592 |
| 2014/0007729 | A1* | 1/2014 | Fredriksson | F16H 59/0278 |
| | | | | 74/473.21 |
| 2014/0165764 | A1* | 6/2014 | Moon | F16H 59/10 |
| | | | | 74/473.21 |
| 2015/0362067 | A1* | 12/2015 | Mitteer | F16H 59/0208 |
| | | | | 74/490.07 |
| 2017/0059034 | A1* | 3/2017 | Makimura | F16H 61/22 |
| 2019/0093763 | A1* | 3/2019 | Smith | F16H 61/18 |
| 2021/0254708 | A1* | 8/2021 | Mayville | F16H 61/24 |

* cited by examiner

FIG. 1A "Prior Art"
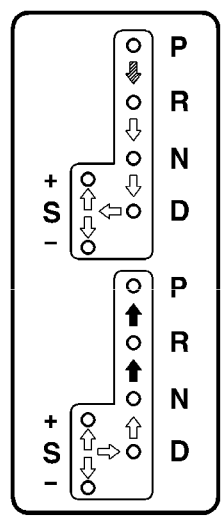
TYPE 1
FIG. 1B "Prior Art"
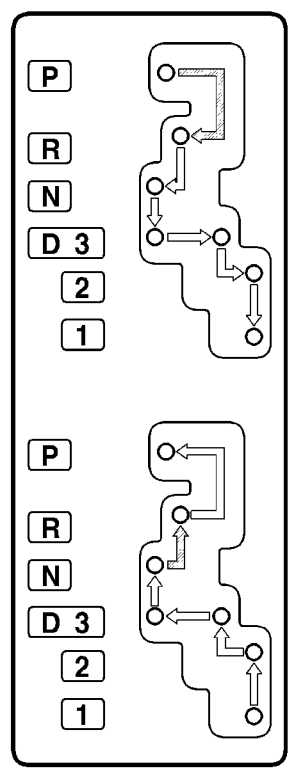
TYPE 1

FIG. 1C "Prior Art"
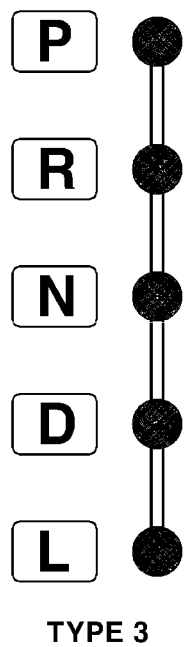
TYPE 3

TRANSMISSION LEVER DEVICE FOR AUTOMOBILE

CROSS-REFERENCE TO RELATED APPLICATION

The application claims priority to and the benefit of Korean Patent Application No. 10-2020-0128737, filed on Oct. 6, 2020, the entire contents of which are incorporated herein by reference.

FIELD

The present disclosure relates to a transmission lever device for an automobile.

BACKGROUND

The statements in this section merely provide background information related to the present disclosure and may not constitute prior art.

An automotive transmission, which is an apparatus that transmits power generated by an engine to driving wheels while changing torque and speed to be suitable for the driving state of the vehicle, is classified into a manual transmission and an automatic transmission. A driver in a vehicle may change gears of a manual transmission or an automatic transmission into desired gears by moving a transmission lever disposed through a console around the driver's seat.

At present, as the shift patterns of an automatic transmissions vehicle, as shown in FIGS. 1A and 1B, there are a first type of park (P)-reverse (R)-neutral (N)-drive (D) and a second type of park (P)-reverse (R)-neutral (N)-drive (D)-third gear-second gear-first gear.

As for the first type, a transmission lever is linearly moved between P and D and shifting (a sports mode, S) is possible by moving the lever left and right at D. As for the second type, a transmission lever may be moved up, down, leftward, and rightward, but when a transmission lever is moved leftward and rightward, there is a disadvantage in that the transmission lever uses too large a space in a vehicle and the number of parts increases.

Accordingly, as shown in FIG. 1C, a third shift pattern having five shift positions of park (P)-reverse (R)-neutral (N)-drive (D)-low gear (L) has recently been proposed.

In the third type, shifting into L may occur regardless of the user's intention. That is, in the first type or the second type, when a lever is positioned at D, the lever is designed not to advance lengthwise. However, according to the third type, the lever may move lengthwise, i.e., from D to L, after moving from N to D, so shifting to L that is not intended by a driver may frequently occur, which may cause inconvenience to a driver.

The foregoing is intended merely to aid in the understanding of the background of the present disclosure, and is not intended to mean that the present disclosure falls within the purview of the related art that is already known to those skilled in the art.

SUMMARY

The present disclosure provides a transmission lever device configured to inhibit shifting to L without a driver's intention in a vehicle having a straight shift pattern.

The present disclosure provides a transmission lever device that enables accurate and convenient shifting into gears intended by the driver.

The objects of the present disclosure are not limited to those described above, and other unmentioned objects of the present disclosure will be clearly understood by a person of ordinary skill in the art from the following description.

The features of the present disclosure to accomplish the object of the present disclosure and to perform characteristic functions of the present disclosure, a description of which will follow, are as follows.

The transmission lever device for an automobile according to one form of the present disclosure includes: a base; a lever rotatably mounted on the base, wherein the lever is configured to select one of sequentially disposed gear positions including park (P), reverse (R), neutral (N), drive (D), and low (L) by a linear movement and the lever is configured to be movable from P to L and from L to P; and a blocker mounted on the base and configured to restrict and guide movement of the lever from P to L.

A transmission lever device for an automobile according to one form of the present disclosure includes: a base; a lever rotatably mounted on the base, wherein the lever is configured to select one of sequentially disposed gear positions including park (P), reverse (R), neutral (N), drive (D), and low (L) by a linear movement and the lever is configured to be movable from P to L and from L to P; and a blocker mounted on the base, wherein the blocker is configured to stop the lever at D when the lever is moved from P toward L and to require additional manipulation on the lever when the lever is moved from D to L.

The present disclosure provides a transmission lever device that is configured to inhibit shifting to L contrary to the driver's intention in a vehicle having a linear shift pattern.

Further, the present disclosure provides a transmission lever device that enables a driver to accurately and conveniently shift as the driver intended.

DRAWINGS

In order that the disclosure may be well understood, there will now be described various forms thereof, given by way of example, reference being made to the accompanying drawings, in which:

FIGS. 1A to 1C are views showing three types of shift patterns that are currently provided for vehicles, respectively;

Figure 2:
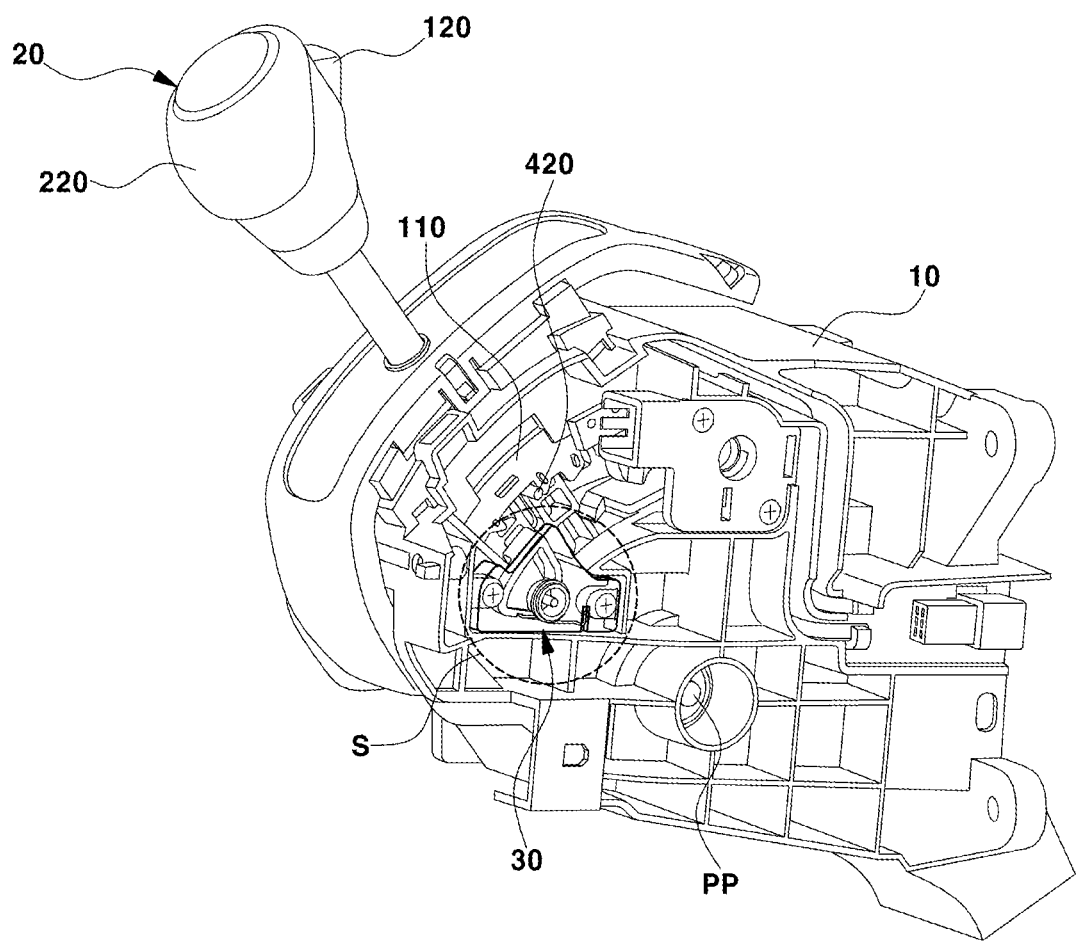
FIG. 2 is a view showing a transmission lever device for an automobile according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, preferred forms of the present disclosure will be described in detail with reference to the accompanying drawings. Specific structures or functions described in various forms of the present disclosure are merely for illustrative purposes. Forms according to the concept of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

Hereinafter, the present disclosure will be described in detail with reference to the accompanying drawings.

As show in FIG. 2, a transmission lever device for an automobile according to the present disclosure includes a base 10, a lever 20, and a blocker 30. The lever 20 and the blocker 30 are mounted on a shift lever assembly or the base 10.

The lever 20 is rotatably mounted on the base 10. In detail, the lever 20 may be rotated about a pivot point PP of the base 10 and a portion of the lever 20 protrudes from the center console (not shown) in a vehicle such that an operator can rotate the lever 20. According to one form of the present disclosure, a shift pattern of park P, reverse R, neutral N, drive D, and low L is disposed straight or in a line, and the lever 20 may be linearly moved between P and L. When the lever 20 is rotated about the pivot point PP, one gear position of P, R, N, D, and L may be selected, and gear change may be carried out in a vehicle based on the selected position of the lever 20.

The lever 20 has a button 120. A knob 220 for easy grip of the lever 20 is formed at the portion of the lever 20 protruding from the center console of a vehicle, and the button 120 may be formed at the knob 220 of the lever 20. The button 120 depresses into the knob 220 when it is pressed and bounces back to protrude from the knob 220 when it is released.

Figure 3:
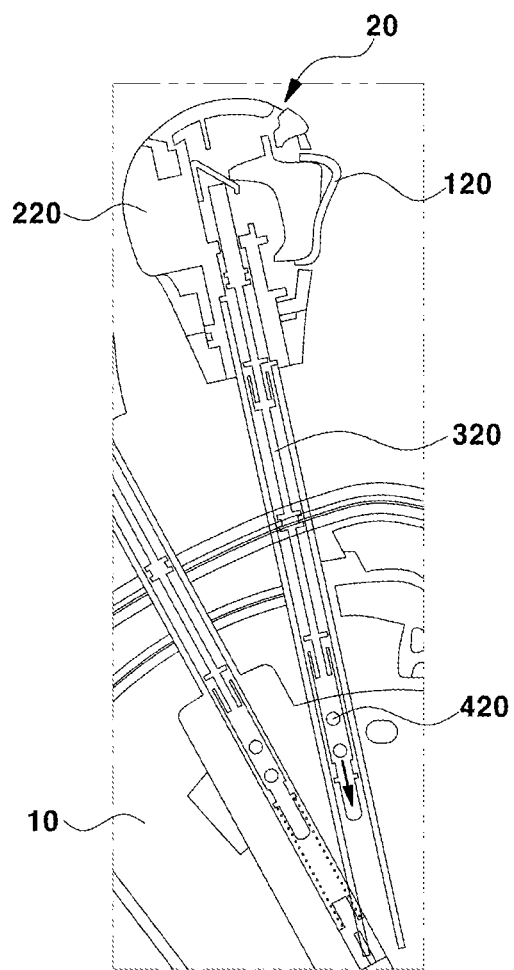
FIG. 3 is a vertical cross-sectional view showing a lever for a transmission lever device according to one form of the present disclosure.

As shown in FIG. 3, a movable rod 320 extending in the longitudinal direction of the lever 20 is disposed in the lever 20. The rod 320 is moved up and down in the longitudinal direction of the lever 20. The rod 320 has a proximal end close to the knob 220 and a distal end far from the knob 220. The distal end of the rod 320 is positioned at the base 10. A detent pin 420 is fastened to the rod 320. The detent pin 420 protrudes radially outward from the rod 320 or substantially forms a right angle with the rod 320.

When the button 120 at the knob 220 is pressed, the rod 320 is pushed downward by the button 120 and moves downward in the lever 20. The detent pin 420 fastened to the rod 320 is moved down together with the rod 320. When the button at the knob 220 is released, the rod 320 moves up, and the detent 420 also moves up and returns to the initial position in the base 10. That is, when the lever 20 is rotated with the button 120 pressed, the detent pin 420 is moved down, and when the button 120 is released at a desired shift position, the detent pin 420 is moved up and locked in the base 10. Accordingly, the lever 20 may be locked at each gear position without freely moving from one position to another position.

Figure 4:
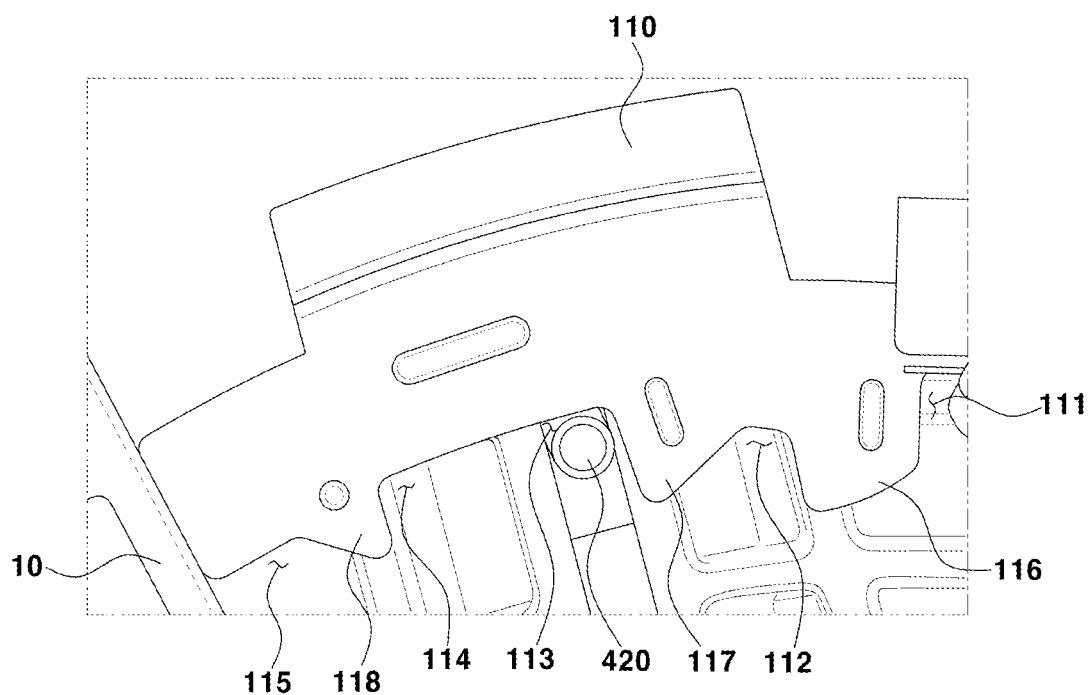
FIG. 4 is a view showing a guide for a transmission lever device according to one form of the present disclosure.

As shown in FIG. 4, the base 10 may have a guide member 110 so that the detent pin 420 engages with the base 10.

The guide member 110 may be engaged with the detent pin 420 of the lever 20, thereby locking and holding the lever 20 at selected shift positions. In particular, the guide member 110 has five positions of first to fifth positions 111, 112, 113, 114, 115 corresponding to P, R, N, D, and L, whereby the lever 20 may be held at selected shift positions. The first position 111 corresponds to P, the second position 112 corresponds to R, the third position 113 corresponds to N, the fourth position 114 corresponds to D, and the fifth position 115 corresponds to L.

The guide member 110 has protrusions 116, 117, 118 that protrude downward to inhibit unexpected movement of the detent pin 420 from a predetermined position to another position of the lever 20. The protrusions 116, 117, 118 may have a first protrusion 116 formed between the first position 111 and the second position 112, a second protrusion 117 formed between the second position 112 and the third position 113, and a third protrusion 118 formed between the fourth position 114 and the fifth position 115. The protrusions 116, 117, 118 may not be formed between the third position 113 and the fourth position 114. In other words, the first to fifth positions 111, 112, 113, 114, 115 may be arranged at both sides of each of the protrusions 116, 117, 118.

Continuously referring to FIG. 4, when the lever 20 is moved to R with the button 120 pressed to shift from P to R, the detent pin 410 engaged with the first position 111 is moved down over the first protrusion 116. When the button 120 is released, the detent pin 420 is moved up to the second position 112 and R is selected.

The second protrusion 117 formed between the second position 112 and the third position 113 is inclined toward the third positions 113, so it is not required to press the button when shifting from R to N. When the lever 20 is rotated from R to N, the detent pin 420 is moved to the third position 113 while sliding over the second protrusion 117, whereby shifting to N is finished.

It is not desired to press the button 120 when shifting from N to D, and when the lever 20 is moved from N to D, the detent pin 420 moves substantially horizontally from the third position 113 to the fourth position 114. This movement is possible because there is no protrusion between the third position 113 and the fourth position 114, as described above. The blocker 30 is involved with shifting from D to L, so it will be described below.

According to one form of the present disclosure, the guide member 110 may be integrally formed with the base 10 or may be formed separately from the base 10 and then combined with the base 10.

Figure 5:
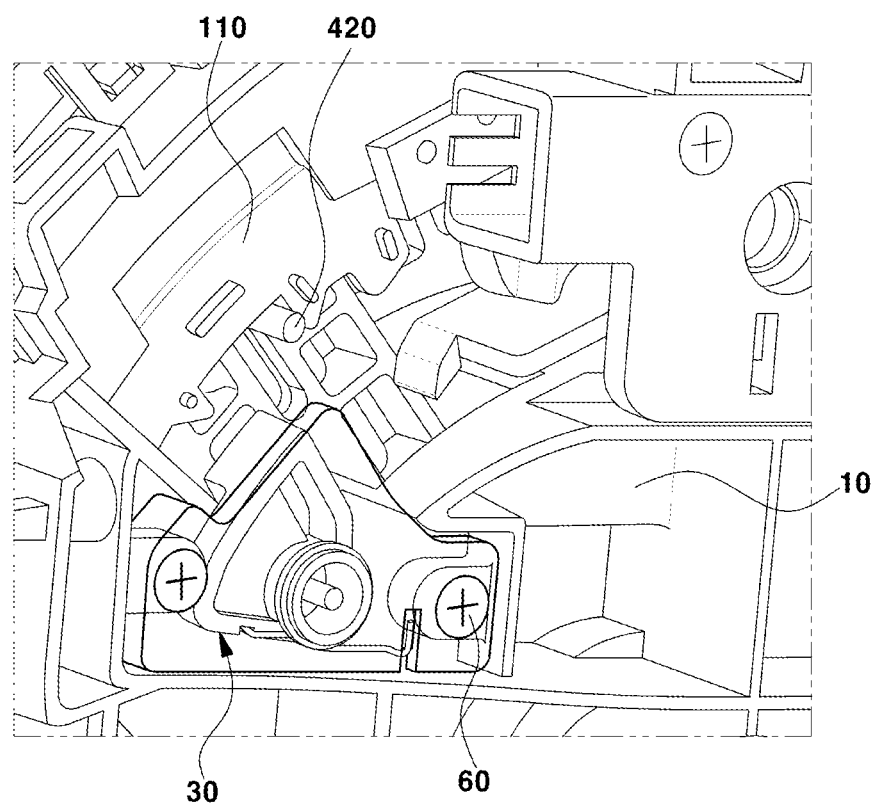
FIG. 5 is a partial enlarged view of the portion S of FIG. 2.
Figure 6:
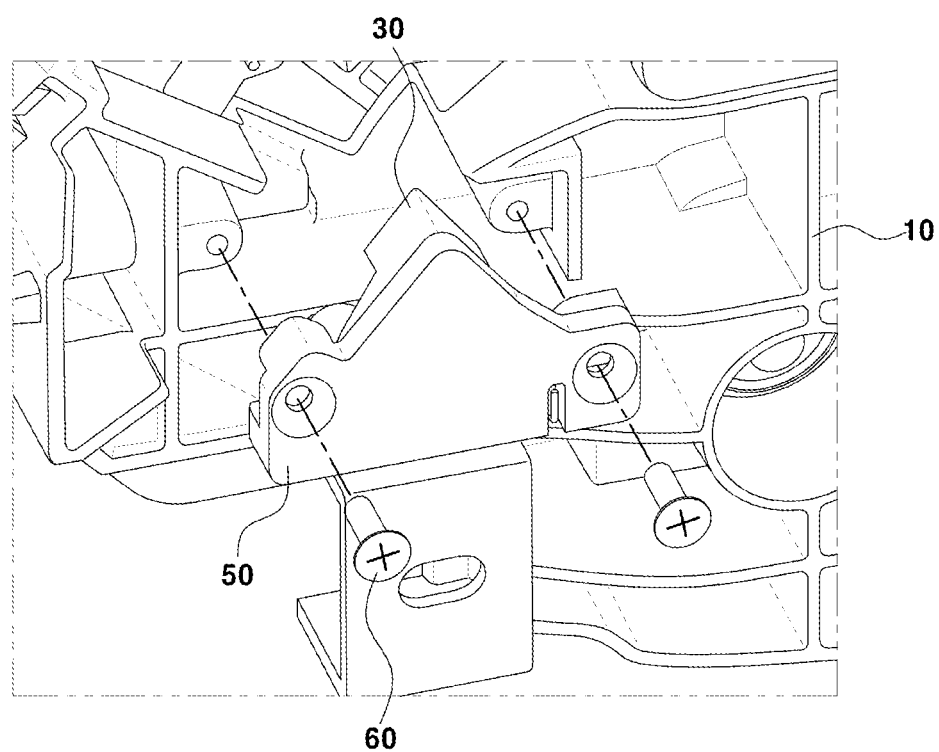
FIG. 6 is a view showing an example of mounting a blocker for a transmission lever device according to one form of the present disclosure.

As shown in FIGS. 5 and 6, the blocker 30 is mounted on the base 10. The blocker 30 is designed to restrict or guide movement of the lever 20 from N to L. In particular, the blocker 30 temporarily stops the lever 20 at D when the lever 20 is moved from P toward L. That is, according to the present disclosure, when the lever 20 approaches D while moving toward L, the lever 20 is stopped, regardless of which one of P, R, and N is the start point. Further, the lever 20 is stopped when approaching D regardless of whether the final destination of the lever 20 is L or D. Therefore, according to one form of the present disclosure, additional manipulation of the lever 20 is desired when the lever 20 is moved from D to L due to the blocker 30.

According to one form of the present disclosure, the blocker 30 is mounted on the base 10. The blocker 30 is configured to come into contact with the detent pin 420 at a specific point in time. The blocker 30 may rotate on the base 10, so the blocker 30 can be pushed to rotate a certain angle by the detent pin 420. The specific point in time means when the detent pin 420 approximately reaches D from the P side. Regardless of whether the start point is P, R, or D, the detent pin 420 comes in contact with the blocker 30 when the detent pin 420 reaches a position close to D (or between the third position 113 and the fourth position 114).

A process of shifting from P to D is now described with reference to FIGS. 7A to 7D. Hereafter, W1 to W7 indicate the position of the detent pin 420.

Figure 7A:
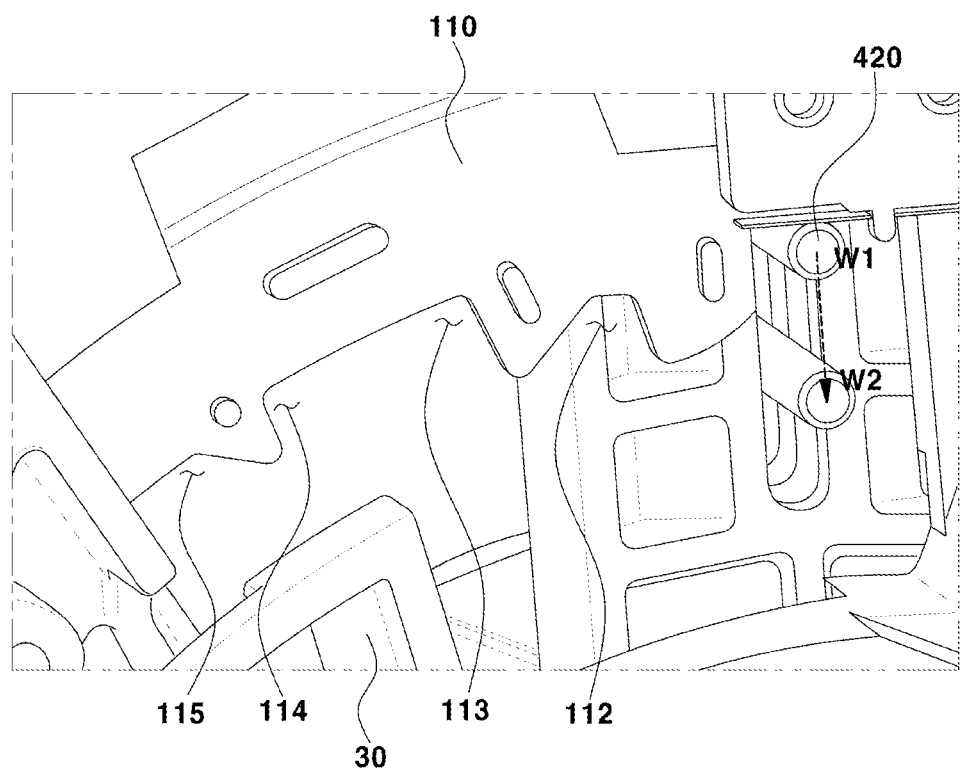
FIGS. 7A to 7D are views showing a process of shifting from P to D by a transmission lever device according to one form of the present disclosure.
Figure 7B:
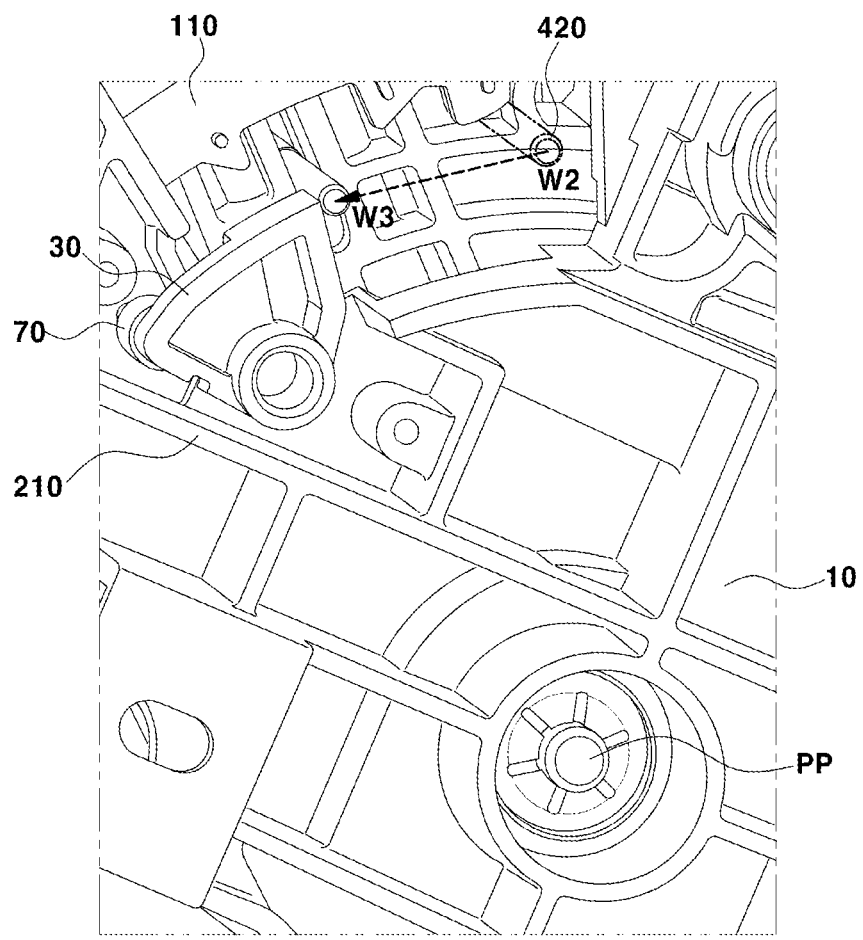
Figure 7C:
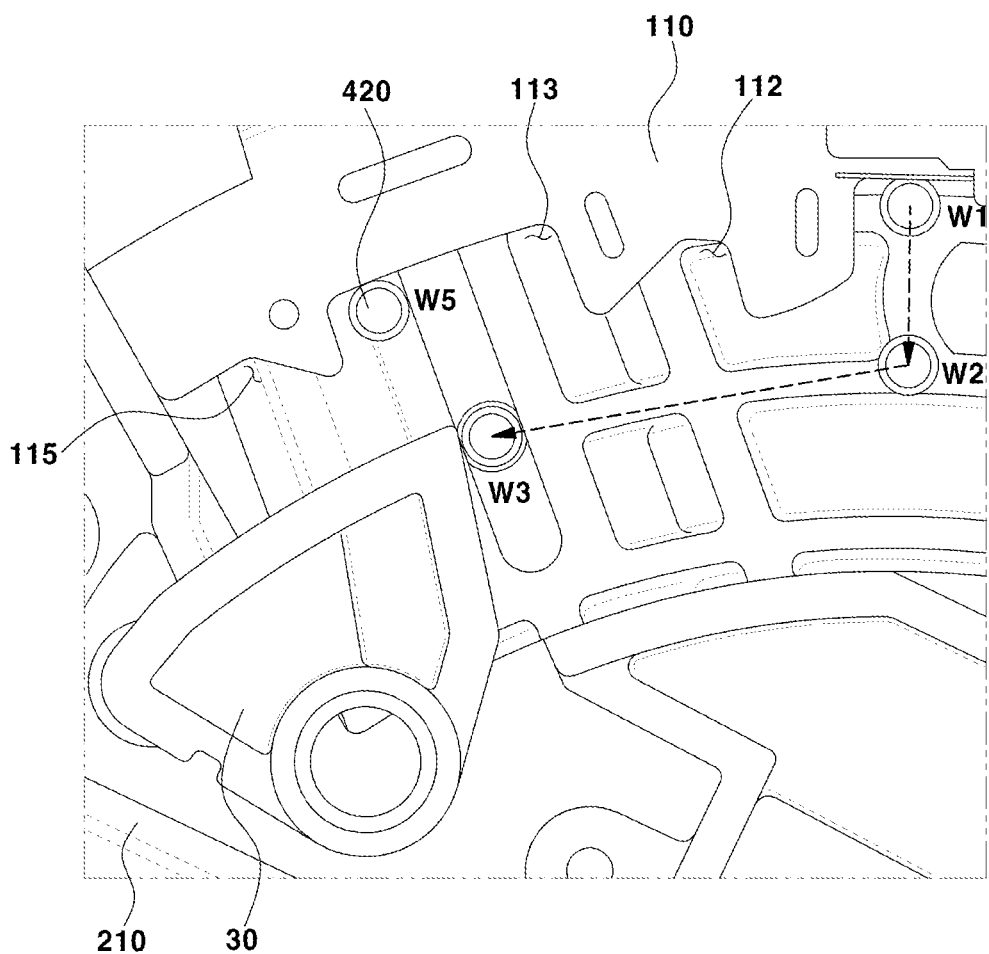
Figure 7D:
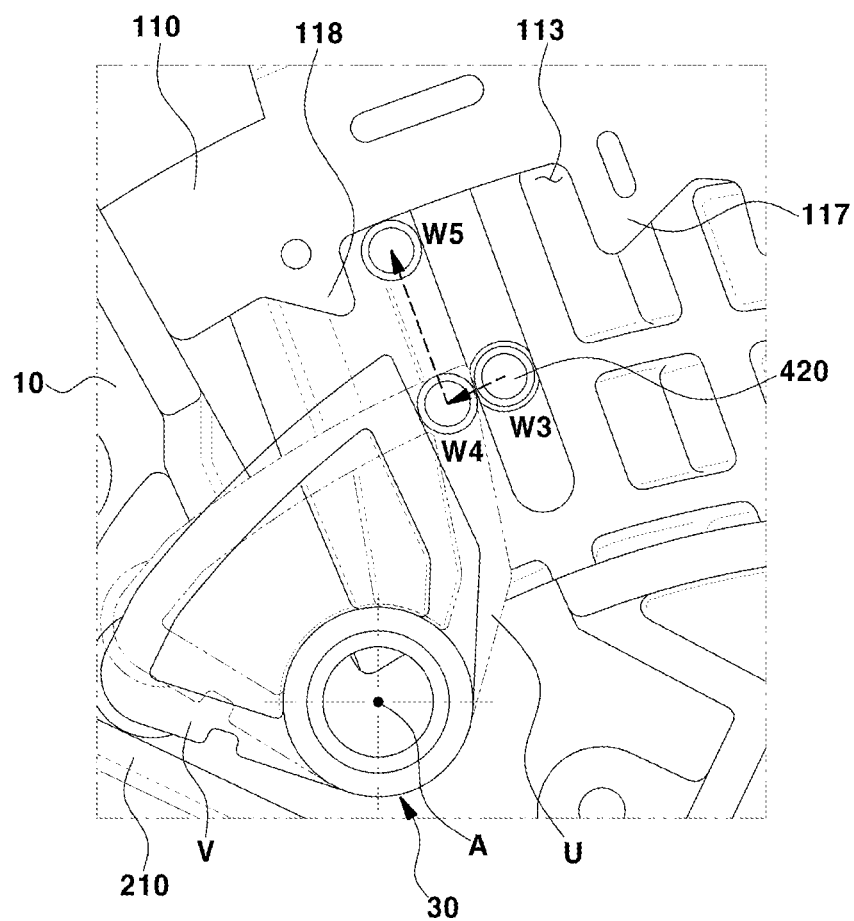

As shown in FIG. 7A, when the button 120 of the lever 120 is pressed to shift from P, the detent pint 420 at the position W1 that is the first position 111 is moved to W2. As shown in FIGS. 7B and 7C, when the lever 20 is rotated from P to D with the button 120 of the lever 20 pressed, the detent pin 420 reaches between the third position 113 and the fourth position 114 by moving under the first protrusion 116 and the second protrusion 117 and comes into contact with the blocker 30 (at the position W3). As shown in FIG. 7D, the point where the detent pint 420 starts to contact with the blocker 30 is between the third position 113 and the fourth position 114, and is not a position corresponding to the fourth position 114 or corresponding to shifting to D. That is, the detent pin 420 needs to further move toward L from the position W3 where the contact occurs in order to reach the fourth position 114 or the position W5 when the button 120 is released. Accordingly, the detent pin 420 (at the position W4) continues to push the blocker 30 in order to move to the fourth position 114 immediately when the button 120 is released, that is, until shifting to D is finished. In this state, the blocker 30 is rotated about a rotational axis thereof and moved from U to V in FIG. 7D. U shows the state in which the detent pin 420 starts to come in contact with the blocker 30 and V shows that state in which the blocker 30 is fully pushed by the blocker 30.

A stopper 210 that stops the blocker 30 to inhibit the blocker 30 from rotating over a predetermined angle is formed on the base 10. When the detent pin 420 reaches the position W4 and the blocker 30 is pushed into the V state, the lever 20 is not further rotated toward L. Accordingly, a driver may recognize that shifting to D has been performed, and when the driver releases the button 120, the detent pin 420 moves to the position W5 that is the fourth position 114 and shifting to D is finished. When the detent pin 420 is moved to the position W5, the blocker 30 returns into the U state, that is, to the initial position.

Figure 8:
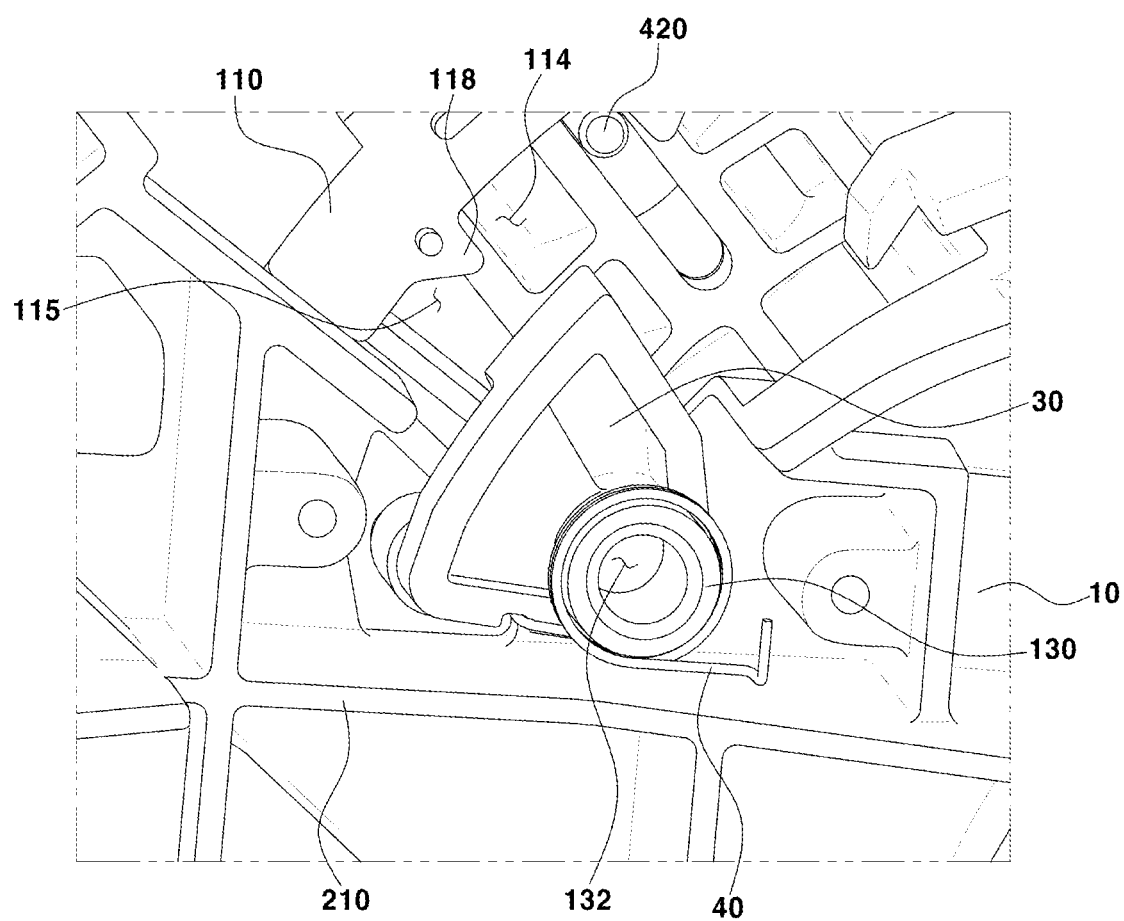
FIG. 8 is a view showing an example of mounting an elastic member and the blocker for a transmission lever device according to one form of the present disclosure.

As shown in FIG. 8, according to one form of the present disclosure, an elastic member 40 may be provided so that the blocker 30 can return into the U state, that is, to the initial position when the blocker 30 is rotated from the U state to the V state by the detent 420 and then the detent pin 420 moves away from the blocker 30. The elastic member 40 provides restoring force with respect to rotation of the blocker 30. When the detent pin 420 reaches the position W4 and the button 120 is released, the pressing force of the detent pin 420 pushing the blocker 30 in contact with the blocker 30 is lifted and the blocker 30 is rotated to the initial position by the restoring force provided by the elastic member 30. As a non-limiting example, the elastic member 40 may include a torsion spring or a tension spring.

Figure 9A:
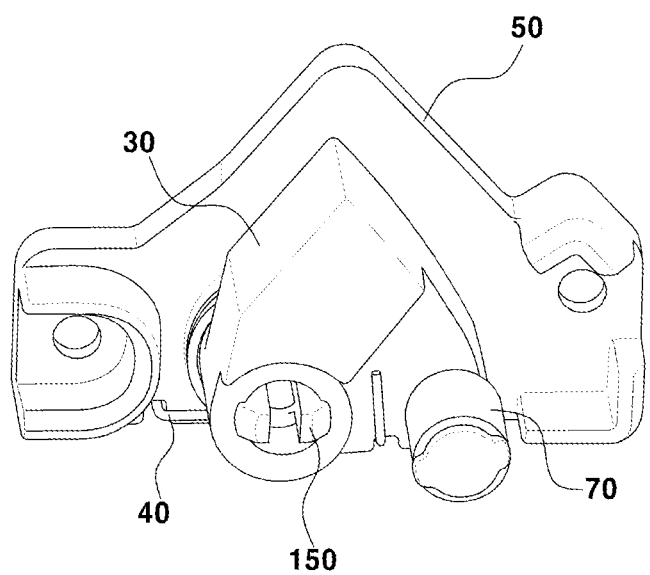
FIG. 9A is a view showing a blocker according to one form of of the present disclosure.
Figure 9B:
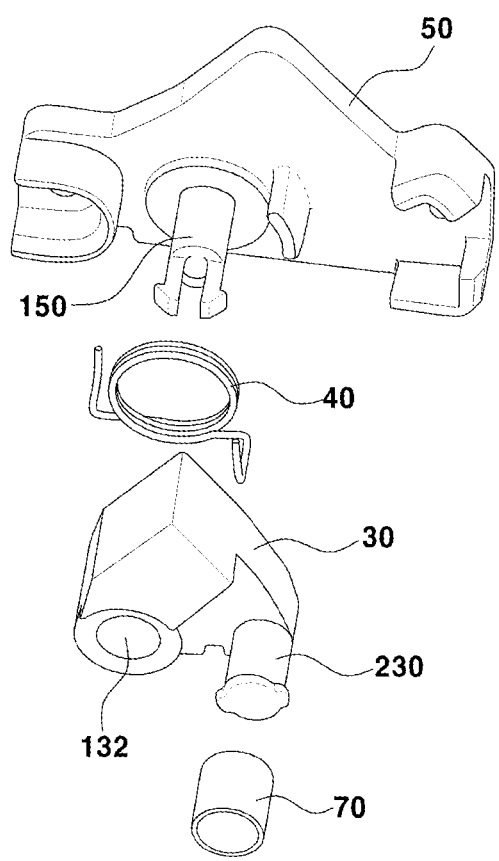
FIG. 9B is an exploded perspective view of FIG. 9A.

According to one form of the present disclosure, as shown in FIGS. 9A and 9B, a cover 50 for inhibiting entry of foreign substances may be disposed over the outer surface of the blocker 30. The cover 50 is mounted outside the blocker 30 to keep the blocker 30 inside and may have a coupling protrusion 150 for coupling to the blocker 30. The distal end of the coupling protrusion 150 which protrudes away from the cover 50 may be fastened in a snap-fit structure so that elastic connection is possible for coupling to the blocker 30.

The cover 50 is mounted on the base 10 with the blocker 30 placed therebetween. The cover 50 may be fastened to the base 10 by screws 60, or the cover 50 may be fastened by a snap-fit structure.

According to one form of the present disclosure, the blocker 30 has a tubular portion 130 protruding from a side directing away from the base 10 or the side facing the cover 50. The tubular portion 130 has a hole 132. The coupling protrusion 150 may be inserted in the hole 132 and the snap-fit structure at the distal end of the coupling protrusion 150 is locked therein, so the cover 50 and the blocker 30 may be fastened to each other.

According to one form of the present disclosure, a fitting protrusion 230 may protrude from another side of the blocker 30 that is the surface facing the base 10. The fitting protrusion 230 may be formed in a rod shape having a circular cross-section.

According to one form of the present disclosure, a sleeve 70 may be fitted on the fitting protrusion 230. The sleeve 70 may be made of rubber. The sleeve 70 comes in contact first with the stopper 210 when the blocker 30 is rotated into the V state and is made of rubber, thereby being able to alleviate shock due to contact and improve durability of the blocker 30.

Figure 10:
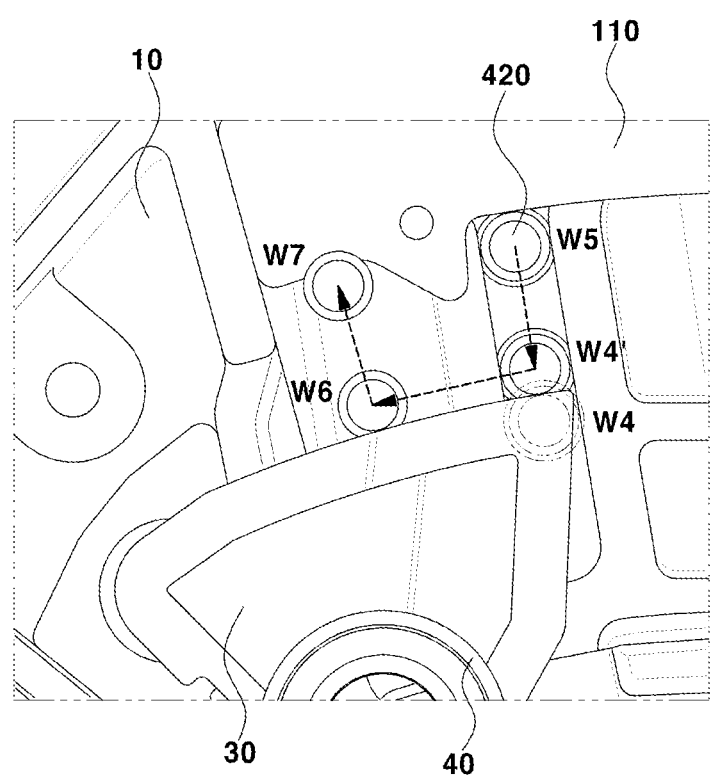
FIG. 10 is a view showing a process of shifting from D to L by a transmission lever device according to one form of the present disclosure.

Shifting from D to L may be performed as follows. Referring to FIG. 10, the detent pin 420 is at the position W5 before the button 120 of the lever 20 is pressed at D. When the button 120 is pressed, the detent pin 420 moves down to a position W4' and comes in contact with the blocker 30. The distance that the detent 420 moves down when the button 120 is pressed at D may be shorter than the distance that the detent pin 420 moves down when shifting from P to D is performed (note the difference between W4 and W4').

When the lever 20 is rotated to L with the button 120 pressed, the detent pin 420 moves to a position W6. When the detent pin 420 reaches the position W6 and the button 120 is released, the detent pin 420 moves up to a position W7.

Figure 11:
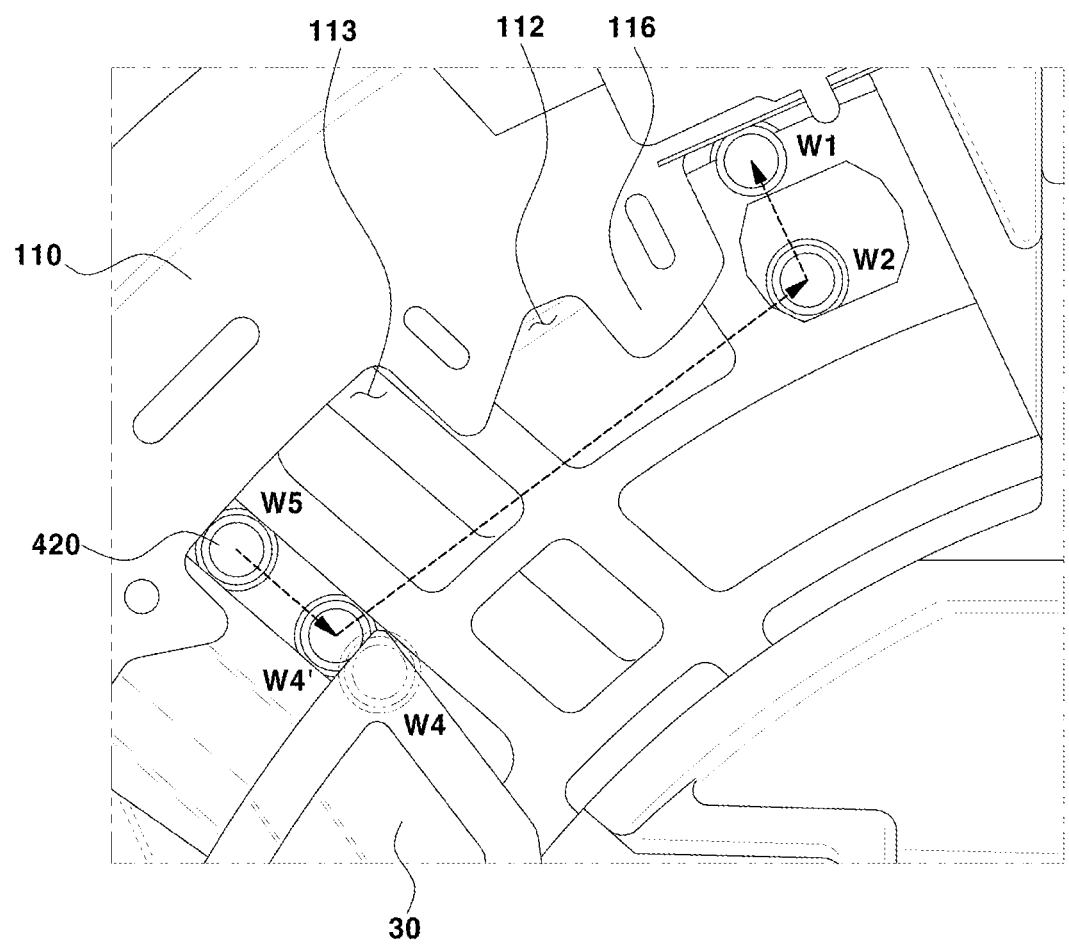
FIG. 11 is a view showing a process of shifting from D to P by a transmission lever device according one form of to the present disclosure.

Shifting from D to P is performed in a similar way. Referring to FIG. 11, when the button 120 is pressed at D, the detent pin 420 moves down from the position W5 to the position W4'. When the lever 20 is rotated toward P with the button 120 pressed, the detent pin 420 moves to the position W2. Further, when the button 120 is released, the detent pin 420 moves to the position W1 that is the first position 111 and shifting to P is performed.

As described above, in the third type of shift pattern (see FIG. 1C), L is positioned under D, so when a driver shifts from P or N to D, the transmission lever is moved even to L in many cases.

According to the present disclosure, when the transmission lever is rotated from P to L, it is temporarily stopped at D. A driver presses the button of the lever knob and rotates the lever to shift from P to L, but the lever is temporarily stopped at D and it is required to additionally release and press again the button in order to switch from D to L. Accordingly, it is possible to inhibit shifting to L contrary to the driver's intention in a simple manner. Therefore, according to the present disclosure, it is possible to provide convenience to a driver and improve the commercial value of a vehicle.

It should be understood that the present disclosure is not limited to the above described forms and the accompanying drawings, and various substitutions, modifications, and alterations can be devised by those skilled in the art without departing from the technical spirit of the present disclosure.

What is claimed is:

1. A transmission lever device for an automobile, the transmission lever device comprising:
   a base;
   a lever rotatably mounted on the base, wherein the lever is configured to select one of sequentially disposed gear positions including park (P), reverse (R), neutral (N), drive (D), and low (L) by a linear movement and to be movable from P to L and from L to P; and
   a blocker mounted on the base wherein the blocker is configured to stop the lever at D when the lever is moved from P toward L, wherein the blocker is rotatably mounted on the base while a linear movement of the blocker with respect to the base is blocked,
   wherein the lever comprises:
      a pressable button provided at a portion of the lever protruding from the base; and
      a detent pin connected to the pressable button to protrude from the lever in the base and configured to move in a longitudinal direction of the lever when the pressable button is pressed, and
   wherein when the lever moves in a direction from P to D, the detent pin is configured to move downward by a first distance longer than a second distance that is moved by the detent pin when the lever moves between L and D.

2. The transmission lever device of claim 1, wherein the detent pin includes a portion perpendicular to the longitudinal direction of the lever.

3. The transmission lever device of claim 1, wherein the lever further comprises a rod disposed in the lever and configured to be movable in the longitudinal direction of the lever when the button is pressed, and
   the detent pin is mounted on the rod.

4. The transmission lever device of claim 1, wherein the detent pin is configured to lock and release at a specific location in the base for each of the sequentially disposed gear positions.

5. The transmission lever device of claim 1, further comprising:
   a guide member disposed in the base and configured to engage the detent pin at a specific position of the base for each of the sequentially disposed gear positions.

6. The transmission lever device of claim 5, wherein the guide member comprises:
   a first position where the detent pin is positioned when the lever is at P with the pressable button released;
   a second position where the detent pin is positioned when the lever is at R with the pressable button released;
   a third position where the detent pin is positioned when the lever is at N with the pressable button released;
   a fourth position where the detent pin is positioned when the lever is at D with the pressable button released;
   a fifth position where the detent pin is positioned when the lever is at L with the pressable button released;
   a first protrusion protruding downward between the first position and the second position;
   a second protrusion protruding downward between the second position and the third position; and
   a third protrusion protruding downward between the fourth position and the fifth position.

7. The transmission lever device of claim 1, wherein the blocker is mounted on the base and is configured to come into contact with the detent pin when the lever is rotated from N to D with the pressable button pressed.

8. The transmission lever device of claim 1, wherein the blocker mounted on the base is configured to come into contact with the detent pin and be pressed by the detent pin when the lever is moved to D from a position between N and D such that the blocker rotates a certain degree.

9. The transmission lever device of claim 8, wherein the base comprises a stopper configured to stop the blocker from further rotating after the lever is moved from N to D.

10. The transmission lever device of claim 9, wherein when the pressable button is released after the blocker is stopped from further rotating, the detent pin moves up in the longitudinal direction of the lever and shifting to D is finished.

11. The transmission lever device of claim 10, wherein shifting to L is allowed when shifting to D is finished and then the lever is rotated toward L with the pressable button pressed again.

12. The transmission lever device of claim 11, wherein when the lever is rotated from L to D, the detent pin is configured to move along a top of the blocker.

13. The transmission lever device of claim 9, wherein a sleeve made of rubber is coupled to a portion of the blocker that comes in contact with the stopper.

14. The transmission lever device of claim 13, wherein the blocker comprises a fitting protrusion protruding toward the base and including the sleeve fitted thereon.

15. The transmission lever device of claim 8, further comprising an elastic member disposed between the blocker and the base, wherein the blocker rotates to an initial position when the pressable button is released.

16. The transmission lever device of claim 1, further comprising:
a cover coupled to the base and configured to cover the blocker.

17. The transmission lever device of claim 16, wherein the blocker comprises a tubular portion protruding outward and including a hole, and the cover is coupled to the tubular portion.

18. The transmission lever device of claim 17, wherein the cover comprises a coupling protrusion protruding toward the blocker and configured to be insertable in the tubular portion.

19. A transmission lever device for an automobile, the transmission lever device comprising:
a base;
a lever rotatably mounted on the base, wherein the lever is configured to select one of sequentially disposed gear positions including park (P), reverse (R), neutral (N), drive (D), and low (L) by a linear movement and to be movable from P to L and from L to P; and
a blocker mounted on the base,
wherein the blocker is configured to stop the lever at D when the lever is moved from P toward L and to require an additional manipulation on the lever when the lever is moved from D to L, wherein the blocker is rotatably mounted on the base while a linear movement of the blocker with respect to the base is blocked,
wherein the lever comprises:
a pressable button provided at a portion of the lever protruding from the base; and
a detent pin connected to the pressable button to protrude from the lever in the base and configured to move in a longitudinal direction of the lever when the pressable button is pressed, and
wherein when the lever moves in a direction from P to D, the detent pin is configured to move downward by a first distance longer than a second distance that is moved by the detent pin when the lever moves between L and D.

20. The transmission lever device of claim 19, wherein the pressable button is configured to rotate the lever, and the additional manipulation is pressing the pressable button and releasing the lever stopped by the blocker.

* * * * *